US 8,402,994 B2

(12) United States Patent
Smit

(10) Patent No.: US 8,402,994 B2
(45) Date of Patent: *Mar. 26, 2013

(54) VALVE ASSEMBLY

(75) Inventor: Peter Martin Smit, Buderim (AU)

(73) Assignee: Weir Minerals Australia Ltd., Artarmon, New South Wales (AU)

( * ) Notice: Subject to any disclaimer, the term of this patent is extended or adjusted under 35 U.S.C. 154(b) by 0 days.

This patent is subject to a terminal disclaimer.

(21) Appl. No.: 13/205,299

(22) Filed: Aug. 8, 2011

(65) Prior Publication Data

US 2012/0024400 A1 Feb. 2, 2012

Related U.S. Application Data

(63) Continuation of application No. 12/805,503, filed on Aug. 3, 2010, now Pat. No. 8,025,076, which is a continuation of application No. 10/533,164, filed as application No. PCT/AU03/01436 on Oct. 30, 2003, now Pat. No. 7,793,682.

(30) Foreign Application Priority Data

Oct. 31, 2002 (AU) .............................. 2002952390

(51) Int. Cl.
 *F16K 24/04* (2006.01)
(52) U.S. Cl. .......... 137/391; 137/43; 137/202; 137/442; 137/588
(58) Field of Classification Search ................ 137/43, 137/202, 429–433, 493, 510, 588, 442, 423; 123/516, 518, 519, 198 D
See application file for complete search history.

(56) References Cited

U.S. PATENT DOCUMENTS

| 1,559,207 A | 10/1925 | Ringelenstein et al. |
| 1,657,112 A | 1/1928 | Doughty |
| 1,709,930 A | 4/1929 | Bronander |
| 1,831,318 A | 11/1931 | Neil et al. |
| 1,968,293 A | 7/1934 | Gould |
| 2,028,816 A | 1/1936 | Allen |
| 2,278,002 A | 3/1942 | Thompson |
| 2,477,186 A | 7/1949 | Koehler |

(Continued)

FOREIGN PATENT DOCUMENTS

| EP | 0 144 549 | 6/1985 |
| FR | 2337686 | 5/1977 |

(Continued)

OTHER PUBLICATIONS

International Search Report dated Jan. 30, 2004 for PCT/AU/2003/001436.

(Continued)

*Primary Examiner* — Craig Schneider
*Assistant Examiner* — Craig J Price
(74) *Attorney, Agent, or Firm* — Jones Day

(57) ABSTRACT

A valve assembly (10) able to be mounted with a liquid container, the valve assembly comprising: a housing (20) having a passageway (60) that extends through the housing; a breather float valve (80) mounted within the housing, the breather float valve movable between an open position to allow gas to pass through the passageway and a closed position that prevents liquid from passing through the passageway; a liquid inlet (30), forming part of the housing, the liquid inlet allowing fluid to pass into the housing; and an inlet float valve (41) mounted within the housing, the inlet float valve movable between an open position that permits the flow of liquid through the liquid inlet and a closed position that prevents the flow of fluid through the liquid inlet.

20 Claims, 6 Drawing Sheets

U.S. PATENT DOCUMENTS

| | | | |
|---|---|---|---|
| 2,492,123 | A | 12/1949 | Judson |
| 2,528,499 | A | 11/1950 | Davies |
| 2,582,105 | A | 1/1952 | Cronkhite |
| 2,666,445 | A | 1/1954 | Cronkhite |
| 2,768,704 | A | 10/1956 | Cronkhite |
| 2,827,915 | A | 3/1958 | Mitchell |
| 3,062,230 | A | 11/1962 | Becht |
| 3,625,264 | A | 12/1971 | Swain |
| 3,726,303 | A | 4/1973 | Allen et al. |
| 3,929,155 | A | 12/1975 | Garretson |
| 3,989,043 | A | 11/1976 | Dimeff |
| 4,064,907 | A | 12/1977 | Billington et al. |
| 4,142,552 | A | 3/1979 | Brown et al. |
| 4,305,422 | A | 12/1981 | Bannink |
| 4,524,794 | A | 6/1985 | Haiens |
| 4,694,847 | A | 9/1987 | Szlaga |
| 4,830,042 | A | 5/1989 | Cho |
| 4,991,615 | A | 2/1991 | Szlaga et al. |
| 5,042,519 | A | 8/1991 | Kerlin |
| 5,095,937 | A | 3/1992 | LeBlanc |
| 5,156,178 | A | 10/1992 | Harris |
| 5,282,496 | A | 2/1994 | Kerger |
| 5,308,386 | A | 5/1994 | Wilkes |
| 5,318,069 | A | 6/1994 | Harris |
| 5,402,818 | A | 4/1995 | Kasugai et al. |
| 5,460,197 | A | 10/1995 | Kerger et al. |
| 5,487,404 | A | 1/1996 | Kerger |
| 5,842,500 | A | 12/1998 | Rockwood et al. |
| 5,850,849 | A | 12/1998 | Wood |
| 5,860,458 | A | 1/1999 | Benjey et al. |
| 6,311,723 | B1 | 11/2001 | Shipp et al. |
| 6,719,000 | B1 | 4/2004 | Forsythe et al. |
| 6,837,262 | B2 | 1/2005 | Cortez et al. |
| 7,258,130 | B2 | 8/2007 | Cortez |
| 7,757,709 | B2 | 7/2010 | Cortez |
| 2008/0202600 | A1 | 8/2008 | Peattie et al. |

FOREIGN PATENT DOCUMENTS

| | | |
|---|---|---|
| FR | 2395444 | 1/1979 |
| GB | 1 153 381 | 5/1969 |
| GB | 1 193 007 | 5/1970 |
| GB | 1 335 188 | 10/1973 |
| GB | 1 440 107 | 6/1976 |
| GB | 1 541 110 | 2/1979 |
| GB | 2 317 382 | 3/1998 |
| JP | 10-213260 | 8/1998 |
| JP | 10-238429 | 9/1998 |

OTHER PUBLICATIONS

Adel Wiggins Group; "Wiggins Fast Fuel System—VR300"; Archived website available at http://replay.web.archive.org/20010412133749/http://adelwiggins.com/module1151-display.php3?i_id=955570077; Apr. 12, 2001; 1 page.

Automatic Shutoff Diesel Refueling 16000 Series System, Feb. 2001; pp. 1-6.

Carter Ground Fueling; OptiFill Non-pressure Refueling Systems; Jul. 2002; 1 page.

Caterpillar; "D11R Carrydozer Track-Type Tractor"; CAT Service Information System; May 1, 2002; 1 page.

Caterpillar; "D11T Carrydozer Track-Type Tractor"; CAT Service Information System; Nov. 1, 2008; pp. 1-4.

Emco Wheaton, G2266 Off-Highway Equipment Automatic Fueling System, Feb. 1998; pp. 1-4.

Fast Fill Systems; Fast Fill and Fast Fueling Systems catalog; 2003; pp. 1-6.

Fast Fill Systems; JSG's Pressureless Shut Off Systems & Demobiliser Dust Caps; Nov. 2006; pp. 1-4.

Shaw Aero Development; "Fastfill System"; Archived website available at http://replay.web.archive.org/20030625122657/http://www.shawaero.com/fastfill.html.htm; Jun. 25, 2003; 1 page.

Shaw Aero Development; Fast Fill Fueling System brochure; May 2004; 2 page.

Shaw Aero Development; Fast Fill System Operational Description brochure; Jun. 2003; 1 page.

Shaw Aero Development; Non-Pressurized Fast Fill System brochure; Jun. 2003; 1 page.

Wiggins Service Systems; Wiggins Non-pressurized Fast Fuel Systems brochure; 2003: pp. 1-2.

Wiggins Service Systems; Wiggins Non-pressurized Systems brochure; 2003; pp. 1-2.

VALVE ASSEMBLY

CROSS REFERENCE TO RELATED APPLICATION

This application is a Continuation of U.S. application Ser. No. 12/805,503, filed Aug. 3, 2010, now allowed, which was a Continuation of U.S. Pat. No. 7,793,682, filed, Nov. 8, 2005, which is a National Phase application of International Application No. PCT/AU2003/001436, filed Oct. 30, 2003, which designates the United States and was published in English, and which claimed priority to Australian Provisional Application No. 2002952390, filed Oct. 31, 2002. Each of these applications, in their entirety, are incorporated herein by reference.

FIELD OF THE INVENTION

This invention relates to a valve assembly. In particular, the invention relates to a valve assembly used to protect fuel tanks from being overfilled with fuel and therefore the invention will be described in this context. However, it is envisaged that the valve assembly may be used to protect other types of containers from being overfilled with other types of fluid.

BACKGROUND OF THE INVENTION

For many years large machinery fitted with fuel tanks have been equipped with fast fill systems to enable rapid filling of large capacity fuel tanks. The existing fast fill fuel systems rely on an air vent that prevents air from escaping the fuel tank when the required level of fuel has been attained. This causes pressure in the fuel tank to increase to a level that automatically shuts-off a fuel supply nozzle.

A major concern of this system is that when the fuel level activates the shut-off for the fuel supply nozzle, the shut-off can be overridden and fuel can continue to be forced into the fuel tank above the normal level. This can cause the fuel tank to rupture from the high pressure attained when filling.

U.S. Pat. No. 6,311,723, (by the applicant), has addressed this problem by devising a flow control valve assembly that prevents the build up of pressure within the fuel tank during and after filling. The flow control valve assembly also prevents the supply fuel nozzle from being overridden thus preventing the possibility of overfilling. U.S. Pat. No. 6,311,723 is hereby incorporated by reference.

The control valve assembly of U.S. Pat. No. 6,311,723 uses a float valve to determine when the level of fuel in the fuel tank is at a desired level. When the desired level of fuel has been attained, the float valve is used to block the flow of fuel through a bleed pipe to stop the flow of fuel through a control valve. An open breather is provided within the fuel tank to allow gas to escape from the fuel tank during filling to prevent the fuel tank from rupturing.

The flow control valve assembly operates very effectively on machinery that is predominately stationary. However, when the control valve assembly is mounted to vehicles' fuel tanks, such as those located in trucks and excavators, some difficulties may be experienced during movement of the vehicle.

One problem that may be experienced is that the float valve may become broken. The float valve comprises a float that is mounted on a pivotally movable elongate arm. This arm can break due to the large forces that are exerted on the arm by the surging fuel caused by movement of the vehicle.

In the event that the control valve assembly fails, in this or any other manner, the fuel supply nozzle will continue to fill the tank and pass fuel through the open breather until the nozzle is shut-off manually. This may lead to many hundreds or even thousands of liters of fuel being wasted and the spilt fuel being disposed.

Another problem that occurs is fuel is passed through the open breather during movement of the vehicle. Fuel surges cause fuel to flow through the open breather and escape the fuel tank. Again, this wastes fuel and is environmentally unfriendly. Further, the spilt fuel also creates a fire hazard.

OBJECT OF THE INVENTION

It is an object of the invention to overcome or alleviate one or more of the above disadvantages or to provide the consumer with a useful or commercial choice.

SUMMARY OF THE INVENTION

In one form, although not necessarily the only or broadest form, the invention resides in a valve assembly able to be mounted with a liquid container, the valve assembly comprising:

a housing having a passageway that extends through the housing;

a breather float valve mounted within the housing, the breather float valve movable between an open position to allow gas to pass through the passageway and a closed position that prevents liquid from passing through the passageway;

a liquid inlet, forming part of the housing, the liquid inlet allowing fluid to pass into the housing; and an inlet float valve mounted within the housing, the inlet float valve movable between an open position that permits the flow of liquid through the liquid inlet and a closed position that prevents the flow of fluid through the liquid inlet.

Preferably, the valve assembly also includes a relief valve that is movable between an open position and a closed position to allow pressure to be relieved from the container.

Preferably, the housing is cylindrical.

Preferably, the float valve includes a float and a stem. A valve seal may be located adjacent the end of the stem.

Preferably, a fuel chamber is located adjacent the inlet in which fuel is passed. A shelter may be provided within the fuel chamber in which an end of the stem is located when the float valve assembly is in the open position

BRIEF DESCRIPTION OF THE DRAWINGS

Embodiment of the invention will be described with reference to the accompanying drawings in which.

DETAILED DESCRIPTION OF THE PREFERRED EMBODIMENT

Figure 1:
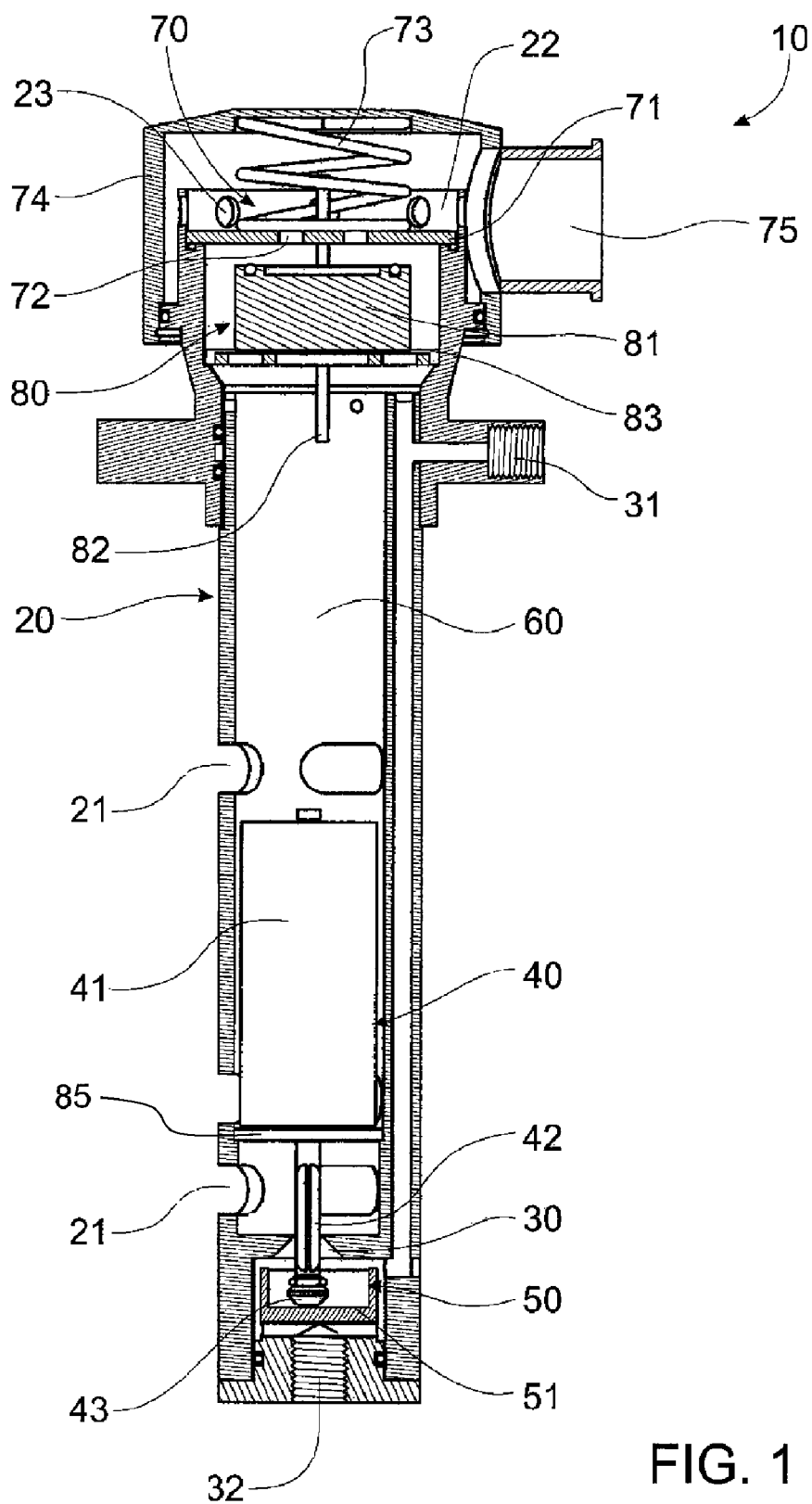
FIG. 1 is a sectional side view of the valve assembly of FIG. 1 with a breather float valve in an open position according to a second embodiment of the invention.
Figure 6:
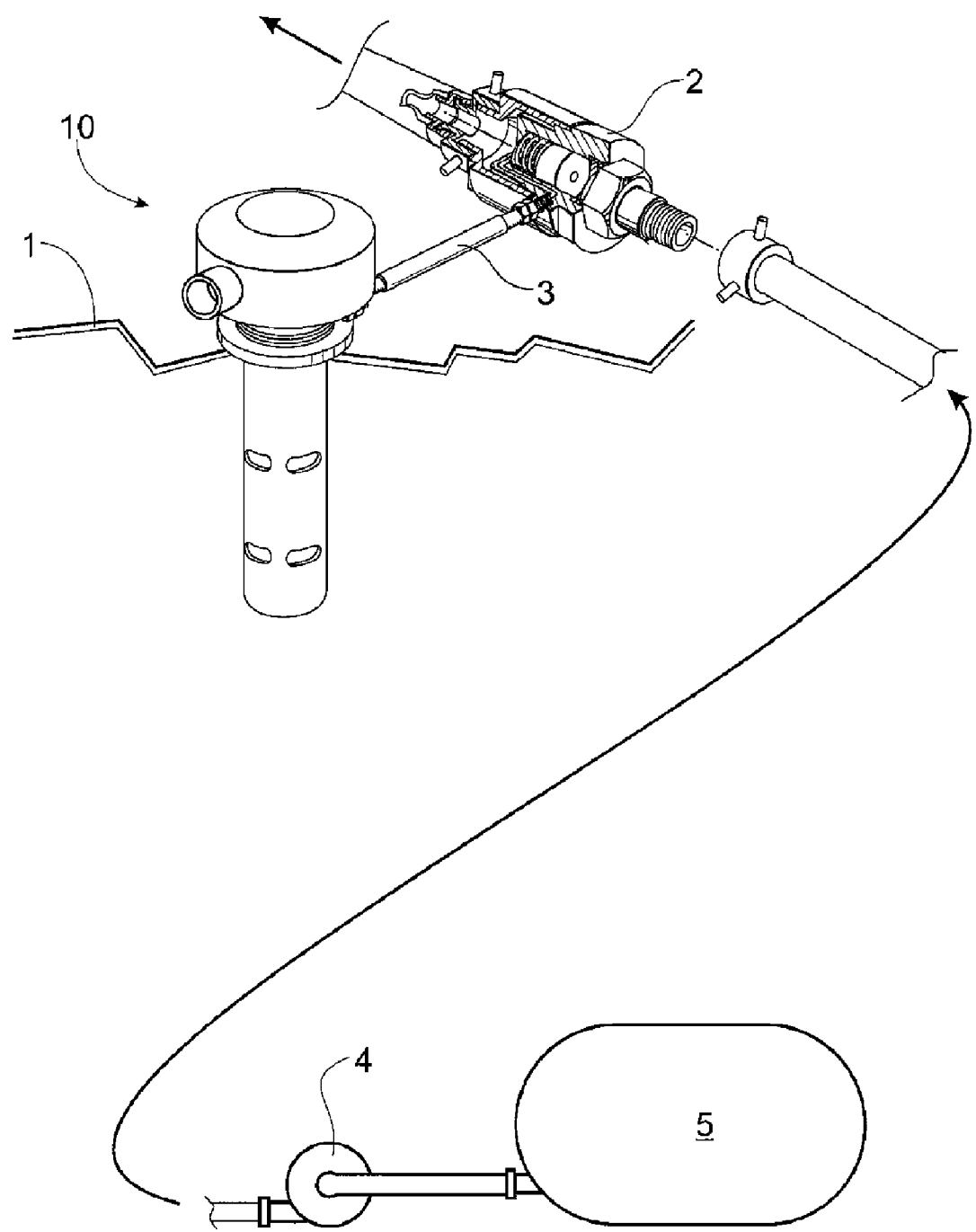
FIG. 6 is a schematic representation of the valve assembly connected to a control valve.

FIG. 1 shows a valve assembly 10 that is primarily used in a fuel tank 1. The valve assembly 10 is normally used in conjunction with a control valve 2, as described in U.S. Pat. No. 6,311,723, to prevent fuel from entering the fuel tank when the fuel tank has reached a predetermined level. FIG. 6 shows the valve assembly 10 connected to the control valve 2 via a bleed pipe 3. The control valve 2 is connected to a fuel pump 4 and supply tank 5.

The valve assembly 10 comprises a housing 20 that is hollow and substantially cylindrical in shape. The housing 20 has several fuel holes 21 located along its length that allow fuel located within the fuel tank to pass in and out of the housing 20.

An inlet 30 is provided at a lower end of the housing 20 through which passes fuel. The inlet 30 is fluidly connected to two separate screw threaded apertures 31 and 32. The bleed pipe 3 is connected to one of the apertures 31 or 32. The bleed pipe is fluidly connected to the control valve to activate the control valve as disclosed in U.S. Pat. No. 6,311,723. The screw-threaded apertures 31 and 32 allow the bleed pipe to be connected outside or inside the fuel tank.

An inlet float valve 40 is housed in a lower end of the housing 20. The inlet float valve 40 is formed from an inlet float 41 and stem 42. A valve seal 43 is located adjacent the end of the stem 42 for sealing the inlet 30.

An inlet float valve 40 is mounted within the housing so that the stem 42 can reciprocate between an open position, in which fuel is able to pass through the bleed pipe 3 and through the inlet 30 into the fuel tank 1, and a closed position that prevents the flow of fuel through the inlet. The substantially cylindrical float is supported by a seat 85 within the cylindrical housing when the inlet float valve is in the open position, the seat extending across the entirely of the substantially cylindrical float and positioned such that the first hole is located below the seat and the second hole is located above the seat, and wherein the substantially cylindrical float is arranged to lift away from the seat in response to liquid entering the second hole so as to move the inlet float valve from the open position to the closed position.

A fuel chamber 50 is located between the inlet 30 and the apertures 31 and 32. The fuel chamber 50 provides a shelter 51 in which an end of the stem 42 is located when the inlet float valve 40 is in the open position.

The top of the housing 20 is open so that a passageway 60 is provided between the inside and outside of the fuel tank. This allows gas to pass from within the fuel tank to the atmosphere so that the fuel tank does not rupture during filling of the fuel tank. A relief plate 71 is positioned within an upper end of the housing 20. Breather holes 72 are located within the relief plate 71. The breather holes 72 form part of the passageway 60.

A breather float valve 80 is provided adjacent the breather holes. The breather float valve 80 is formed from a breather float 81 and a rod 82. A platform 83 and the relief plate 71 guide rod 82. The float 81 is able to reciprocate along the length of the rod 82 between the relief plate 71 and the platform 83. The rod 82 is fixed to the float 81 with circlips.

The breather float valve 80 is in an open position when the breather float 81 is located adjacent the platform 83 and gas is free to pass through the breather holes 72. The breather float valve 80 is in a closed position when the breather float 81 is located over the breather holes 72 and fuel cannot pass through the breather holes 72.

A relief valve 70 is formed adjacent a top end of the housing 20. The relief valve 70 is formed from the relief plate 71, a spring 73 and a cap 74. The relief plate is able to move within a skirt 22 formed at the top of the housing 20. The skirt 22 has a number of circumferentially spaced relief holes 23. The spring 73 holds the relief plate at the base of the skirt 22. The spring 73 is held in position by a cap 74 that is located over the housing 20.

In use, the valve assembly 10 has a number of functions. In a normal fueling operation, the inlet float valve 40 is in the open position such that the stem 42 sits within the shelter 51 as shown in FIG. 1. The bleed pipe 3 passes fuel in to the fuel chamber 50. The fuel then passes through the inlet 30, into the housing 20 and out the fuel holes 21 into the fuel tank. Any turbulence that is created by the fuel passing through the fuel chamber 50 does not effect the valve seal 43 as it is located within the shelter 51.

Figure 2:
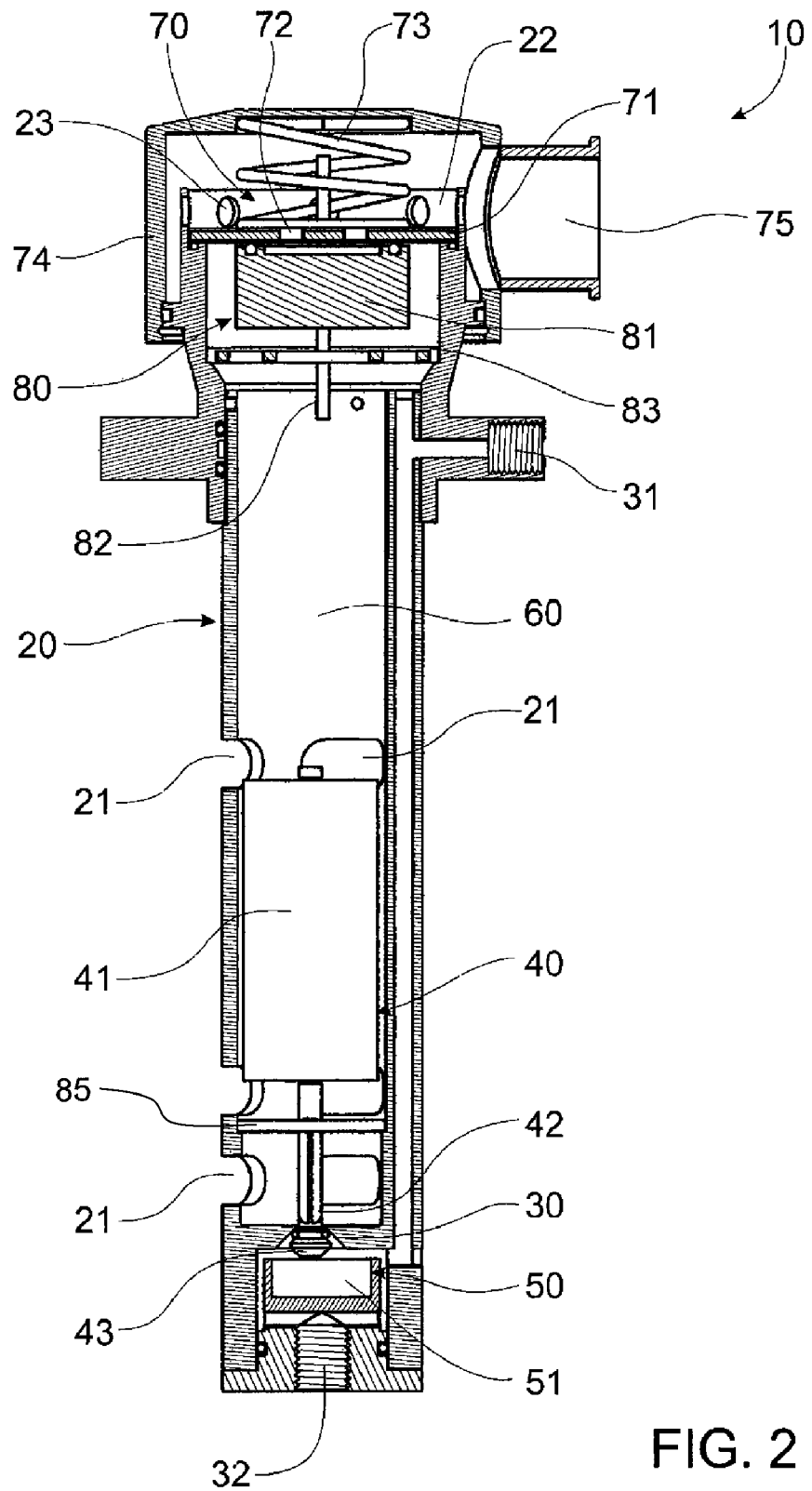
FIG. 2 is a section side view of the valve assembly of FIG. 1 with the breather float valve and the inlet float valve in a closed position.

As the fuel tank fills with fuel, the passageway 60 of the housing 20 also fills with fuel to the same level. The inlet float 41 rises within the housing until the valve seal 43 blocks the inlet 30 as shown in FIG. 2. The pressure of the fuel within the bleed pipe, as well as the fuel within the tank acting on the float, maintains the valve seal 43 in position within the inlet 30. Once the inlet 30 is blocked, the bleed pipe 3 fills with fuel causing the control valve 2 to become closed and prevents further filling of the fuel tank.

When the vehicle is moving, the housing 20 prevents damage of the inlet float valve 40. The impact forces created by surging fuel within the fuel tank impact the housing 20 not the inlet float valve 40.

However, the surging fuel can still extend up passageway 60 and up to the breather holes 72. The breather float valve 80 prevents this surging fuel from escaping through the breather holes 72 as the breather float 81 moves with the surging fuel blocking the breather holes 72 as shown in FIG. 2.

The breather float valve 80 also provides a fail safe during fuelling of the fuel tank. If the bleed pipe 3 is severed or the control valve fails or the inlet float valve fails, then a fuel supply nozzle (not shown) will continue to pump fuel into the fuel tank. The fuel tank will fill with fuel until the breather float 81 moves to the closed position to block the breather holes 72. The continued fuelling of the fuel tank creates pressure within the fuel tank. When the fuel tank reaches a fuel nozzle shut off pressure, then the fuel supply nozzle will shut-off stopping the fuel tank from rupturing.

Figure 3:
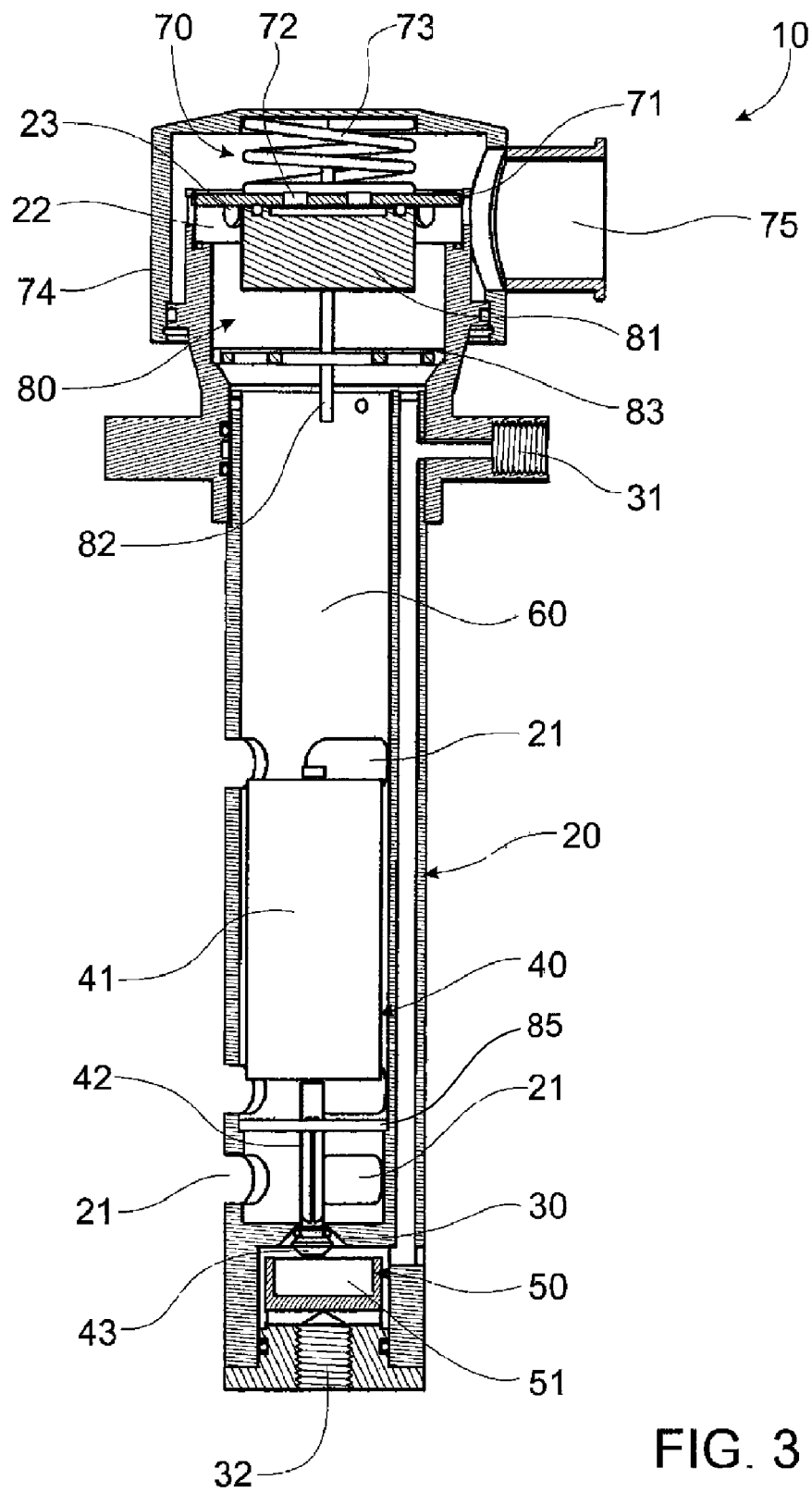
FIG. 3 is a section side view of the valve assembly of FIG. 1 with a relief valve in an open position.

If the fuel supply nozzle does not shut off automatically due to a mechanical fault, then the fuel supply nozzle will continue to supply fuel to the fuel tank. This causes the pressure within the fuel tank to increase. At a pressure less than the rupture pressure of the tank, the pressure relief valve is opened as shown in FIG. 3. This occurs when the fuel tank pressure becomes greater than the spring pressure causing the relief plate 71 to move upwardly until it passes over the relief holes 23 in skirt 22. Fuel then passes from the tank, through the relief holes 23, into the cap 74 and through a cap hole 75. The fuel flowing from the cap 74 will indicate to an operator to shut the fuel supply nozzle off manually.

Figure 4:
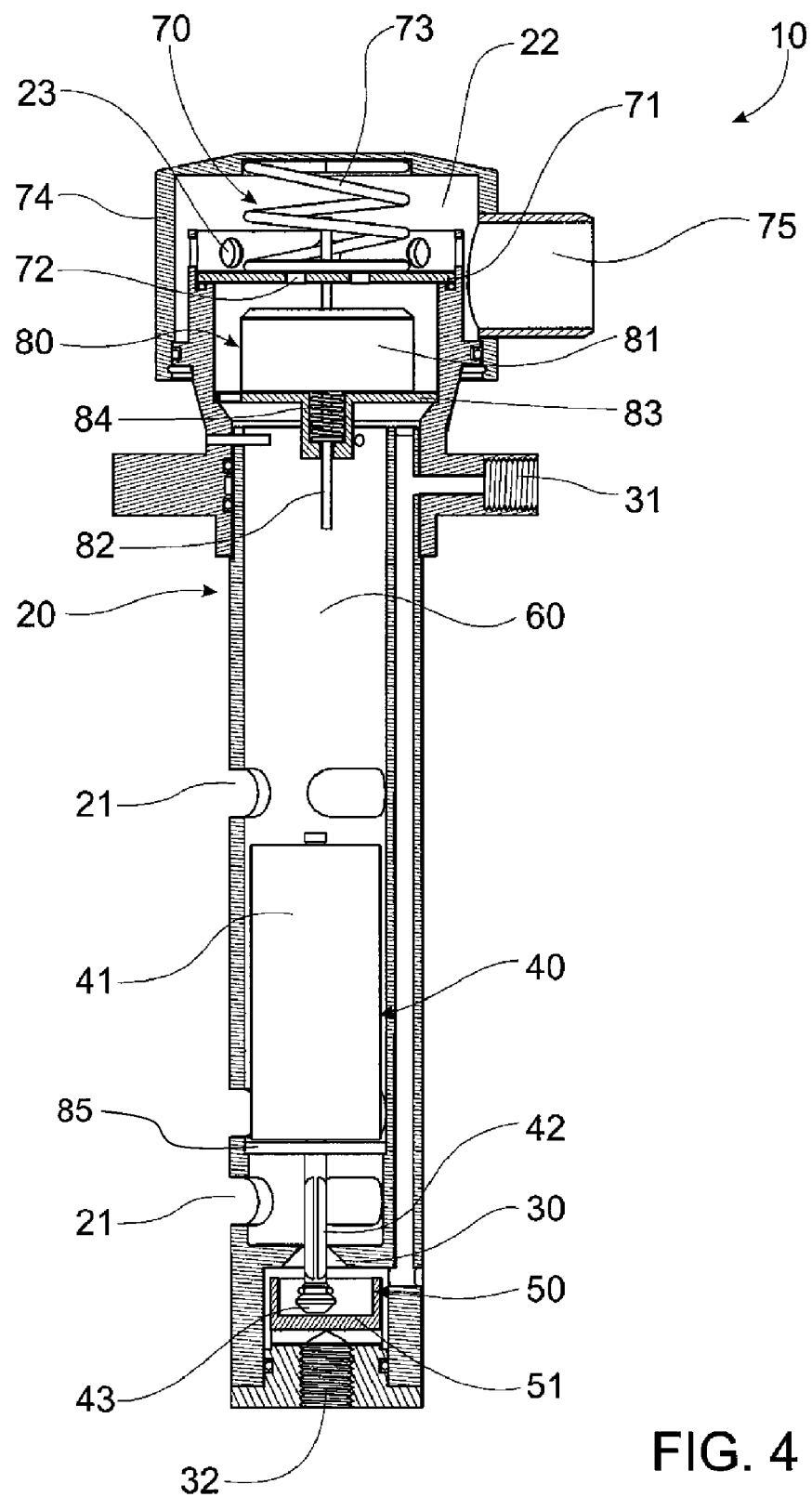
FIG. 4 is a sectional side view of the valve assembly of with a breather float valve in an open position according to a second embodiment of the invention.
Figure 5:
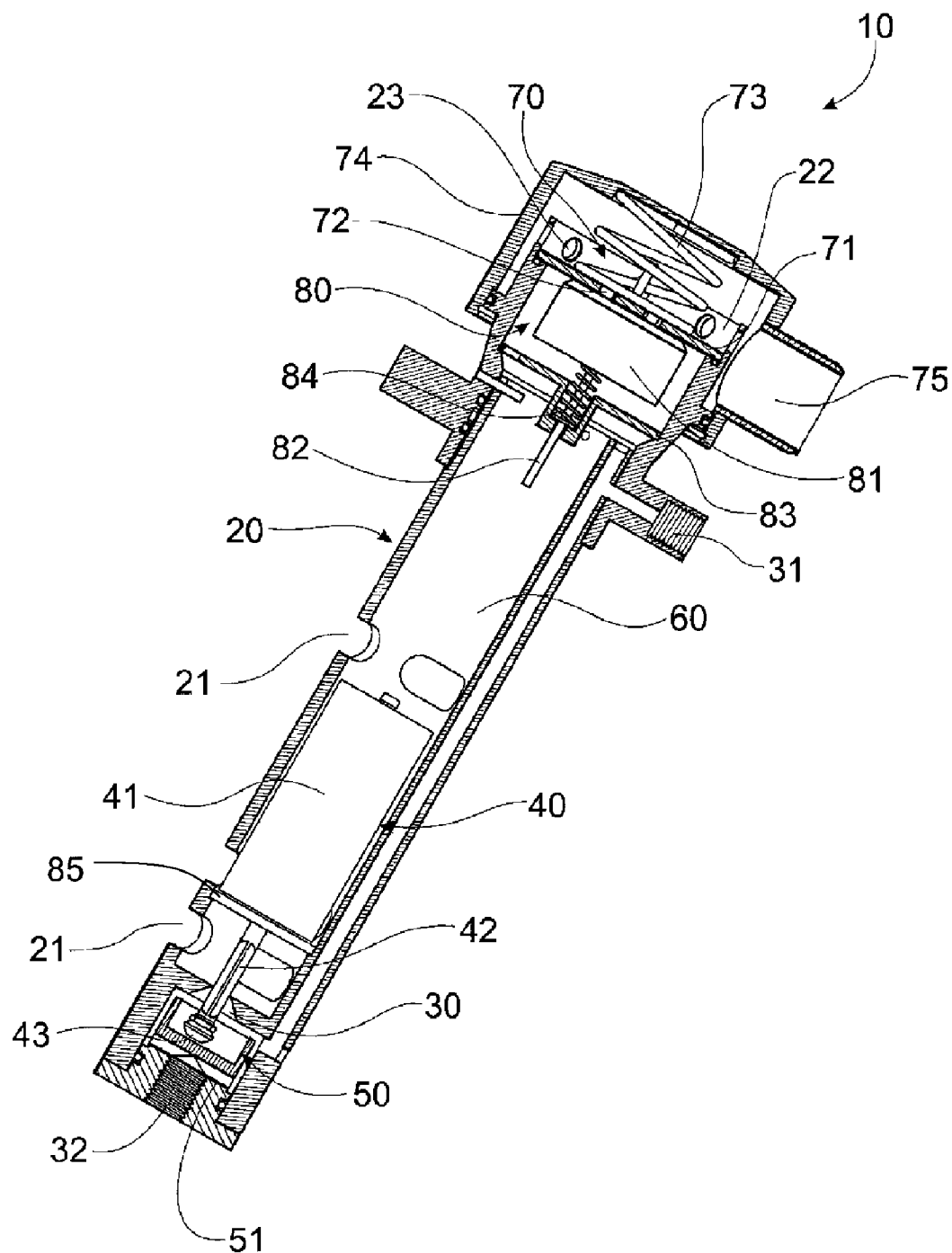
FIG. 5 is a sectional side view if the valve assembly of FIG. 4 with a breather float valve in a closed position.

FIG. 4 and FIG. 5 show a second embodiment of a valve assembly 10. In this embodiment, a breather float valve spring 84 is mounted around the rod 82 on the modified platform 83 below the breather float 81. The breather float valve spring 84 engages the breather float 81.

The breather float valve spring 84 assists in moving the breather float 81 to the closed position in the event of a vehicle roll over. The breather float 81 is of sufficient weight to compress the breather float valve spring 84 when the valve assembly is in a substantially vertical position. However, during a roll over, less force is applied by the breather float 81 on the breather float valve spring 84 when the valve assembly 10 moves from a substantially vertical position to a substantially horizontal position. Therefore, the breather float valve spring 84 causes the breather float 81 to move to the closed position so that fuel cannot escape from the tank through the breather holes 72 in the event of a vehicle roll over.

The valve assemble provides a number of advantages. Firstly, the valve assembly is not damaged by surging fuel making the valve assembly suitable for use in vehicles. Secondly, the breather float valve prevents fuel from escaping the valve assembly when the fuel surges within the fuel tank during movement of the vehicle. Thirdly, in the event of failure of the inlet float valve, control valve or bleed pipe, the breather float valve prevents the loss of fuel by blocking the breather holes causing pressure build up within the fuel tank and thus causing the fuel supply nozzle to shut off, Lastly, the pressure relief valve prevents the fuel tank from rupturing from over pressurizing of the fuel tank.

The valve assembly can be easily retro fitted or fitted into existing tanks. It is sized to fit into holes that are located in tanks for existing systems.

It should be appreciated that various other changes and modifications may be made to the embodiment described without departing from the spirit or scope of the invention.

The invention claimed is:

1. A valve assembly able to be mounted with a liquid container, the valve assembly comprising:
    a cylindrical housing;
    a liquid inlet; and
    an inlet float valve comprising a substantially cylindrical float, a stem, and a valve seal located adjacent an end of the stem, the inlet float valve located within the cylindrical housing, the inlet float valve movable between an open position that permits the flow of liquid through the liquid inlet out of the cylindrical housing and into the liquid container and a closed position that does not permit the flow of liquid through the liquid inlet out of the cylindrical housing and into the liquid container
    wherein a fuel chamber is located adjacent the liquid inlet into which liquid is passed before passing through the liquid inlet;
    wherein a shelter is provided within the fuel chamber and the end of the stem is located within the shelter when the inlet float valve is in the open position; and
    wherein the cylindrical housing comprises a first hole, a second hole, and a third hole through a wall of the cylindrical housing, the first hole configured to allow liquid to pass through the cylindrical housing and into the liquid container when the inlet float valve is in the open position, the second hole being in close proximity to the first hole and located above the first hole, the second hole configured to allow liquid to pass into the cylindrical housing from the liquid container to move the inlet float valve to the closed position and the third hole located above the second hole and positioned on the wall of the cylindrical housing such that at least a portion of the third hole is located above the top portion of the substantially cylindrical float when the inlet float valve is in the closed position.

2. The valve assembly of claim 1 wherein the substantially cylindrical float is supported by a seat within the cylindrical housing when the inlet float valve is in the open position, the seat extending across the entirety of the substantially cylindrical float and positioned such that the first hole is located below the seat and the second hole is located above the seat; and wherein the substantially cylindrical float is arranged to lift away from the seat in response to the liquid level within the liquid container so as to move the inlet float valve from the open position to the closed position.

3. The valve assembly of claim 1 wherein the valve assembly includes a relief valve that is movable between a closed position and an open position to allow liquid to pass out of the liquid container to allow pressure to be relieved from the liquid container.

4. The valve assembly of claim 3 wherein the relief valve includes a relief plate, a spring and a cap.

5. The valve assembly of claim 4 wherein the cylindrical housing comprises a first hole, a second hole, and a third hole through a wall of the cylindrical housing, the first hole configured to allow liquid to pass through the cylindrical housing and into the liquid container when the inlet float valve is in the open position, the second hole being in close proximity to the first hole and located above the first hole, the second hole configured to allow liquid to pass into the cylindrical housing from the liquid container to move the inlet float valve to the closed position and the third hole located above the second hole and positioned on the wall of the cylindrical housing such that at least a portion of the third hole is located above the top portion of the substantially cylindrical float when the inlet float valve is in the closed position.

6. The valve assembly of claim 5 wherein the substantially cylindrical float is supported by a seat within the cylindrical housing when the inlet float valve is in the open position, the seat extending across the entirety of the substantially cylindrical float and positioned such that the first hole is located below the seat and the second hole is located above the seat; and wherein the substantially cylindrical float is arranged to lift away from the seat in response to the liquid level within the liquid container so as to move the inlet float valve from the open position to the closed position.

7. The valve assembly of claim 4 wherein the valve assembly is adapted to receive a breather float, the breather float movable between an open position to allow gas to pass through an opening and out of the liquid container and a closed position that prevents liquid from passing through the opening.

8. The valve assembly of claim 7 wherein the cylindrical housing comprises a first hole, a second hole, and a third hole through a wall of the cylindrical housing, the first hole configured to allow liquid to pass through the cylindrical housing and into the liquid container when the inlet float valve is in the open position, the second hole being in close proximity to the first hole and located above the first hole, the second hole configured to allow liquid to pass into the cylindrical housing from the liquid container to move the inlet float valve to the closed position and the third hole located above the second hole and positioned on the wall of the cylindrical housing such that at least a portion of the third hole is located above the top portion of the substantially cylindrical float when the inlet float valve is in the closed position.

9. The valve assembly of claim 8 wherein the substantially cylindrical float is supported by a seat within the cylindrical housing when the inlet float valve is in the open position, the seat extending across the entirety of the substantially cylindrical float and positioned such that the first hole is located below the seat and the second hole is located above the seat; and wherein the substantially cylindrical float is arranged to lift away from the seat in response to the liquid level within the liquid container so as to move the inlet float valve from the open position to the closed position.

10. A valve assembly comprising:
    a cylindrical housing comprising:
    a housing wall;

a passageway within the cylindrical housing;
a first hole through the housing wall;
a liquid inlet located within the cylindrical housing;
an inlet float valve located within the cylindrical housing, the inlet float valve comprising a substantially cylindrical float, a stem and a valve seal located adjacent an end of the stem, the inlet float valve movable between an open position that permits the flow of liquid through the liquid inlet and out of the housing through the first hole and a closed position that does not permit the flow of liquid through the liquid inlet and out of the housing through the first hole;
a relief valve comprising:
a cap;
a spring; and
a relief plate that is movable between a closed position and an open position by compression of the spring such that in operation, liquid is permitted to pass through the relief valve to allow pressure to be relieved from a container through at least one relief hole; and
a breather float configured to be movable between an open position to allow gas to pass through at least one breather hole located in the relief plate and a closed position that prevents liquid from passing through the at least one breather hole.

11. The valve assembly of claim 10 further comprising a fuel chamber located adjacent the liquid inlet through which liquid is passed before passing through the liquid inlet.

12. The valve assembly of claim 11 wherein a shelter is provided within the fuel chamber and the end of the stem is located within the shelter when the inlet float valve is in the open position to reduce turbulence created by liquid passing through the fuel chamber.

13. The valve assembly of claim 12 wherein the cylindrical housing further comprises a second hole and a third hole, wherein the first hole is configured to allow liquid to pass through the cylindrical housing into the liquid container when the inlet float valve in the open position, wherein the second hole is in close proximity to the first hole and located above the first hole, the second hole configured to allow liquid to pass into the cylindrical housing from the liquid container to move the inlet float valve to the closed position, and wherein the third hole is located above the second hole and positioned on the housing wall such that at least a portion of the third hole is located above the top portion of the substantially cylindrical float when the inlet float valve is in the closed position.

14. The valve assembly of claim 13, wherein the substantially cylindrical float is supported by a seat within the cylindrical housing when the inlet float valve is in the open position, the seat extending across the entirety of the substantially cylindrical float and positioned such that the first hole is located below the seat and the second hole is located above the seat; and wherein the substantially cylindrical float is arranged to lift away from the seat in response to the liquid level within the liquid container so as to move the inlet float valve from the open position to the closed position.

15. A valve assembly comprising:
a cylindrical housing comprising:
a housing wall;
a passageway within the cylindrical housing;
a first hole through the housing wall;
a liquid inlet;
a fuel chamber located adjacent the liquid inlet through which liquid is passed before passing through the liquid inlet
an inlet float valve located within the cylindrical housing, the inlet float valve comprising a substantially cylindrical float, a stem and a valve seal located adjacent an end of the stem, the inlet float valve movable between an open position that permits the flow of liquid through the liquid inlet and out of the cylindrical housing through the first hole and a closed position that does not permit the flow of liquid through the liquid inlet and out of the cylindrical housing through the first hole; and
a relief valve comprising:
a cap;
a spring; and
a relief plate that is movable between a closed position and an open position by compression of the spring such that in operation, liquid is permitted to pass through the relief valve to allow pressure to be relieved from a container through at least one relief hole;
wherein a shelter is provided within the fuel chamber and the end of the stem is located within the shelter when the inlet float valve is in the open position; and
wherein the cylindrical housing further comprises a second hole and a third hole, wherein the first hole is configured to allow liquid to pass through the cylindrical housing into the container when the inlet float valve in the open position, wherein the second hole is in close proximity to the first hole and located above the first hole, the second hole configured to allow liquid to pass into the cylindrical housing from the container to move the inlet float valve to the closed position, and wherein the third hole is located above the second hole and positioned on the housing wall such that at least a portion of the third hole is located above the top portion of the substantially cylindrical float when the inlet float valve is in the closed position.

16. The valve assembly of claim 15 wherein the substantially cylindrical float is supported by a seat within the cylindrical housing when the inlet float valve is in the open position, the seat extending across the entirety of the substantially cylindrical float and positioned such that the first hole is located below the seat and the second hole is located above the seat; and wherein the substantially cylindrical float is arranged to lift away from the seat in response to the liquid level within the liquid container so as to move the inlet float valve from the open position to the closed position.

17. The valve assembly of claim 16 wherein the valve assembly is adapted to receive a breather float configured to be movable between an open position to allow gas to pass through at least one breather hole located in the relief plate and a closed position that prevents liquid from passing through the at least one breather hole.

18. A valve assembly able to be mounted with a liquid container, the valve assembly comprising:
a relief valve comprising a cap; a spring; and a relief plate that is movable between a closed position and an open position by compression of the spring to allow liquid to pass out of the liquid container to allow pressure to be relieved from the container through at least one relief hole; and
a breather float valve, the breather float valve movable between an open position to allow gas to pass through an at least one breather hole located in the relief plate and a closed position that prevents liquid from passing through the at least one breather hole;
a cylindrical housing comprising a housing wall;
a liquid inlet;
a first hole in the housing wall; and
an inlet float valve located within the cylindrical housing and comprising a substantially cylindrical float, a stem and a valve seal located adjacent an end of the stem, the inlet float valve movable between an open position that permits the flow of liquid through the liquid inlet and out of the cylindrical housing through the first hole in the housing wall and a closed position that does not permit the flow of liquid through the liquid inlet and out of the cylindrical housing through the first hole in the housing wall.

19. The valve assembly of claim 18 further comprising:
a fuel chamber located adjacent the liquid inlet into which liquid is passed before passing through the liquid inlet; and
a shelter located within the fuel chamber wherein the end of the stem is located within the shelter when the inlet float valve is in the open position.

20. The valve assembly of claim 19 further comprising:
a second hole located above the first hole on the housing wall; and
a third hole located above the second hole on the housing wall;
wherein the first hole is configured to allow liquid to pass through the cylindrical housing into the liquid container when the inlet float valve is in an open position, wherein the second hole is in close proximity to the first hole and configured to allow fluid to pass into the cylindrical housing from the liquid container to move the inlet float valve to the closed position, and wherein the third hole is positioned on the housing wall such that at least a portion of the third hole is located above the top portion of the substantially cylindrical float when the inlet float valve is in the closed position;
wherein the substantially cylindrical float is supported by a seat within the cylindrical housing when the inlet float valve is in the open position, the seat extending across the entirety of the substantially cylindrical float and positioned such that the first hole is located below the seat and the second hole is located above the seat; and
wherein the substantially cylindrical float is arranged to lift away from the seat in response to the liquid level within the liquid container so as to move the inlet float valve from the open position to the closed position.

* * * * *